(12) United States Patent
Ciacchini (10) Patent No.: US 12,305,693 B2
(45) Date of Patent: May 20, 2025

(54) PRESSURE FIXING DEVICE OF PANEL-WORKS, IN PARTICULAR COVERING PANELS IN THE NAUTICAL FIELD

(71) Applicant: BC Consulting S.r.l., Bientina (IT)

(72) Inventor: Enrico Ciacchini, Vicopisano (IT)

(*) Notice: Subject to any disclaimer, the term of this patent is extended or adjusted under 35 U.S.C. 154(b) by 777 days.

(21) Appl. No.: 17/616,168

(22) PCT Filed: Apr. 9, 2020

(86) PCT No.: PCT/IB2020/053389
§ 371 (c)(1),
(2) Date: Dec. 2, 2021

(87) PCT Pub. No.: WO2020/245672
PCT Pub. Date: Dec. 10, 2020

(65) Prior Publication Data
US 2022/0307530 A1    Sep. 29, 2022

(30) Foreign Application Priority Data

Jun. 5, 2019 (IT) .................. 102019000008175

(51) Int. Cl.
*F16B 5/06* (2006.01)
*F16B 43/00* (2006.01)

(52) U.S. Cl.
CPC ............ *F16B 5/0628* (2013.01); *F16B 5/065* (2013.01); *F16B 5/0664* (2013.01); *F16B 43/009* (2013.01)

(58) Field of Classification Search
CPC ...... F16B 5/0664; F16B 5/065; F16B 5/0628; F16B 5/0621; F16B 5/0607; F16B 5/0233; F16B 2005/0671; F16B 21/086
(Continued)

(56) References Cited

U.S. PATENT DOCUMENTS 6,238,123 B1    5/2001  Schwarzbich
6,543,956 B2 *  4/2003  Schwarzbich ........ F16B 5/0233
                                                    403/167
(Continued)

FOREIGN PATENT DOCUMENTS

CN    114076135 A  *  2/2022  ............ F16B 37/042
DE     4224575 A1  *  3/1993  ........... B62D 25/147
(Continued)

*Primary Examiner* — Michael P Ferguson
*Assistant Examiner* — Zachary A Hall
(74) *Attorney, Agent, or Firm* — Themis Law (57) ABSTRACT

A fixing device for fixing of two bodies to each other, for example a panel to a wall or two panels to each other, includes a male element having a support base and an engaging element, the support base having a rear surface for leaning onto one of the two bodies to be connected and a front surface from which the engaging element protrudes; and a female element having a support base with a rear surface for leaning and fixing onto the other body and a receiving channel for receiving the engaging element of the male element so that the engaging element, when inserted into the receiving channel, snaps inside it detachably, thus enabling the releasable coupling of the two bodies. The fixing device is configured for selecting two or more different distances along the axis defined by the rear surfaces of the male and female elements when coupled.

9 Claims, 11 Drawing Sheets

(58) Field of Classification Search
USPC .................................................. 403/43, 361
See application file for complete search history.

(56) References Cited

U.S. PATENT DOCUMENTS

| | | | | |
|---|---|---|---|---|
| 7,963,011 | B2 * | 6/2011 | Lottini | .................. F16B 5/0664 |
| | | | | 24/691 |
| 9,464,659 | B2 * | 10/2016 | Schwarzbich | .......... F16B 35/04 |
| 2008/0178437 | A1 * | 7/2008 | Lottini | .................. E04F 13/088 |
| | | | | 24/586.11 |
| 2011/0286816 | A1 * | 11/2011 | Johnson | ................ F16B 5/0233 |
| | | | | 411/433 |
| 2018/0313381 | A1 | 11/2018 | Schulz | |

FOREIGN PATENT DOCUMENTS

| | | | | |
|---|---|---|---|---|
| DE | 10227237 | A1 * | 1/2004 | .............. F16B 43/00 |
| DE | 102017115307 | A1 * | 1/2019 | |
| EP | 1950430 | | 7/2008 | |
| FR | 2891029 | A1 * | 3/2007 | ............ F16B 37/045 |

\* cited by examiner

PRESSURE FIXING DEVICE OF PANEL-WORKS, IN PARTICULAR COVERING PANELS IN THE NAUTICAL FIELD

TECHNICAL FIELD

The present invention relates to the technical field of devices for the quick fixing of panels or panel-works to support surfaces, as well as the reciprocal fixing between panels, in particular for fixing a panel to a wall in the naval or nautical field.

More particularly, the invention relates to an innovative type of quick snap-like fixing capable of enabling the adjustment of the reciprocal distance between two surfaces to be connected, therefore an adjustment according to a vertical direction Z.

BRIEF OUTLINE OF THE PRIOR ART

EP publication EP1950430 in the name of Ciacchini Enrico describes a quick fastening system for connecting a panel to a support surface as well as two panels to each other.

In general, above all in the nautical field, there is a need to fix covering panel-works to fixed support surfaces according to a method, which enables a quick application and above all a quick disassembly.

In fact, panel-works often cover passages of cables or other materials, which may require an inspection or a maintenance call-out and, therefore, their removal may be necessary.

Initially, panels were fixed permanently but their removal, for the above reason, was often complicated and might have caused a damage or a destruction of the panel, which had to be replaced by a new one.

The solution proposed in publication EP1950430 resolves such technical drawbacks and, therefore, provides two respective fixing elements structured for being engaged reciprocally in a snap-like releasable manner. Both elements have a plain anchoring surface of a discoidal form, which enables a connection of each to a surface, for example one element may be connected to a panel and the other element to a fixing wall where the panel may be fastened. In this manner, when the first element is connected to the panel and the second element is connected to the wall, it is possible to connect the panel to the wall in a quick and releasable manner through them.

Therefore, structurally, one of the two elements forms a receiving channel of a predetermined axial length and diameter with a generally cylindrical shape and protruding from the disc surface thereof. Internally, the channel has a certain shape described thereinafter. Therefore, such element is a female element that is constrained to a male element.

The other element, i.e., the male element, is shaped as a penetrating cylindrical body protruding from the discoidal surface thereof. This penetrating body is formed by a plurality of teeth protruding from the discoidal base and arranged around a circumference so as to form such cylindrical body or a sort of penetrating cup. The teeth are distanced from one another and are flexible so as to be able to inflect either towards the central axis of symmetry of the discoidal body from which they protrude (therefore, inwards) or outwards (i.e. opposite to the axis of symmetry) to then return elastically to the original position when the force, which determines their inflection, is released.

Therefore, for example, by fixing the male element onto a panel and the female element onto a support surface, it is possible to fix the panel onto the surface by pushing the cylindrical penetrating body within the receiving channel.

In this way, during the penetration, the teeth bend inwards (i.e., towards the central axis of symmetry) due to the suitable shape of the receiving channel, which tightens its diameter to reach a locking position after the penetration, and those teeth then snap elastically to return to the rest position, due to the presence of a diametral broadening on top of the receiving channel (i.e., the cylindrical housing), such broadening forming a locking step. In this simple and functional way, the two elements are locked to each other, thus determining the locking of the panel to the surface.

The disassembly is quite quick, since it is sufficient to apply a traction to the panel. In this way, the teeth pulled towards the direction of extraction bend elastically to release the housing where they are housed to return afterwards to the rest position once they have exceeded the locking step.

The discoidal elements are fitted with holes for the passage of screws to enable the application of the male element and the female element to the relative surfaces.

The above described system also enables, due to a tangential backlash, also a tangential adjustment of the cup of teeth, so as to counterbalance possible inaccuracies and make each panel shift tangentially by a few millimeters in order to find the correct position or the best possible position.

This system, available on the market for a long time, is known under the trade name "fit-lock".

A technical drawback of the above described system, which is particularly felt and unresolved, yet is of concern, is the frequent need to adjust the axis Z to the vertical direction.

After the application of a panel to the wall, it may occur that the panels are not perfectly coplanar to each other and the same panels may also have slight deformations. Obviously, the missed coplanarity cannot be accepted aesthetically but the current systems do not enable an easy adjustment of coplanarity, and gaps or steps are often present between a panel and the next one, which one can hardly hide.

Publications US2018/0313381 e U.S. Pat. No. 6,238,123 are also known.

SUMMARY OF THE INVENTION

Therefore, the aim of the present invention is to provide an innovative solution with a quick attachment, which resolves the above described technical drawbacks.

In particular, the aim of the present invention is to provide an innovative solution of quick attachment capable of enabling the connection of a panel to a surface, as well as the connection of two panels to each other, wherein it is in any case possible to adjust the final distance between the two surfaces which are connected to each other through the system of quick attachment, thus enabling an adjustment along the vertical axis Z, which ensures coplanarity between all the assembled panels.

These and other aims are achieved through a fixing device according to the invention, which enables the reciprocal fixing of two bodies (100, 200) to each other, for example the fixing of a panel (100) to a wall (200) or of two panels (100) to each other.

A device according to the invention comprises:
A male element (A) comprising a support base (10) and an engaging element (15), said support base having a rear surface (10p) for leaning onto one of two bodies to be connected to each other and a front surface (10*a*) from which an engaging element (15) protrudes;

A female element (B) comprising a support base (10B) having a rear surface (10Bp) for leaning onto the other body and a receiving channel (25) configured to receive inside it said engaging element (15) of the male element (A) so that said engaging element, when inserted into the said receiving channel (25), is locked inside it in a detachable manner, thus enabling the releasable coupling of the said two bodies;

According to the invention, the fixing device is configured to select two or more different distances along the axis Z so that, after the male element is coupled to the female, the rear surface (10*p*) of the male element (A) and the rear surface (10Bp) of the female element (B) are at a specific selected distance.

Therefore, this makes it possible to select or adjust with a certain tolerance the final distance that the connected bodies will have between them, thus compensating possible missing coplanarities.

In fact, it is possible to adjust the device according to settings such that a final distance along the axis Z between the coupling bodies corresponds to each setting. This adjustability enables the correction of possible missing coplanarities.

In the event that, after the assembly, there are panels which are not coplanar, then it is sufficient to remove the panel by simply drawing it off, thus releasing the male element connected to the panel by the female element integral with the body to which the panel is connected, and the desired setting of the device is carried out for compensating the millimeters of the missed coplanarity.

In a possible constructive solution, advantageously, the female element (B) may be formed by a first element (B'), forming a central hole, and a second element (B") comprising the receiving channel (25) within which the engaging element (15) is locked, the receiving channel (25) becoming inserted within the central hole of the first element (B').

According to this constructive solution, the first and the second element (B', B") are coupled to each other in a rotatable manner such that the reciprocal rotation also determines a contemporaneous shifting along the axis (Z) of the second element (B") with respect to the first element (B') or vice versa.

In this manner, it is sufficient to rotate one element with respect to the other one to adjust the value of the shift, which determines the final position afterwards. Therefore, if there is a problem of coplanarity, one can act with this rotation to adjust a shifting along the desired axis Z in the order of one millimeter.

In greater detail, the first element (B') forms at least one sliding track (14B) with a predetermined inclination, the second element (B") having at least one appendix (43*a*, 43*b*, 43*c*, 43*d*) which is positioned onto said sliding track (14B) when the second element (B") is coupled with the said first element (B'). In this manner, in correspondence of the rotation of a predetermined amount of the second element with respect to the first element or vice versa, the appendix moves along the sliding track, whose inclination determines, simultaneously with the rotation, also the shifting along the axis Z of the second element (B") with respect to the first element (B') or vice versa.

In this manner, the adjustment of position along the axis Z occurs by readily rotating the two elements in relation to each other by a predetermined amount. A predetermined lowering/raising corresponds to each amount of rotation, which may vary in the order of a few millimeters, for example from 0 to 5 mm.

Obviously, different ranges may be realized.

Advantageously, the first element (B') forms four sliding tracks (14B) in succession to one another so as to delimit a circular path. In this case, each sliding track is produced equal to the other remaining ones and with the same inclination. As a consequence, the second element (B") will have four appendixes (43*a*, 43*b*, 43*c*, 43*d*), which extend radially from the cylindrical body forming the receiving channel (25) and so as to position each one in a respective sliding track (14B).

Advantageously, the sliding track may be in form of a groove with a predetermined inclination.

Advantageously, the/each sliding track comprises a notch (14B') passing through the entire thickness of the sliding track and extending along at least one part of the sliding track in correspondence of the center-line thereof.

Advantageously, the appendixes may have a through hole (11B) for the passage of screws or fixing inserts configured to enable the fixing of the female element (B) to the body (100, 200) to which it is applied.

Advantageously, the through hole (11B) may be aligned with the through notch (14B'), the width of the through notch being such as to enable the passage of the screw or the insert insertable into the relative appendix so that the rotation of the first element with respect to the second element or vice versa can also occur when the screw is inserted into the hole of the appendix.

Advantageously, the engaging element (15) is formed by a plurality of flexible teeth (12), which form as a whole a cylindrical cup configured to be inserted and locked in snap-like manner inside the receiving channel (25).

Advantageously, the cylindrical cup is fixed to the support base so as to have a predetermined tolerance of tangential mobility along the support base.

BRIEF DESCRIPTION OF THE DRAWINGS

Additional features and advantages of the present fixing device, according to the invention, will become apparent from the following description of preferred embodiments thereof, given only by way of a non-limiting example, with reference to the attached drawings, wherein:

FIG. 4A and FIG. 4B are views and related sections of the two separated parts, which compose the female element (B); in particular, FIG. 4A depicts the component B' formed by the discoidal base and by the cylindrical channel to which the component B", depicted in view and section in FIG. 4B, is coupled in a sliding manner along the axis Z;

DESCRIPTION OF SOME PREFERRED EMBODIMENTS

Figure 1:
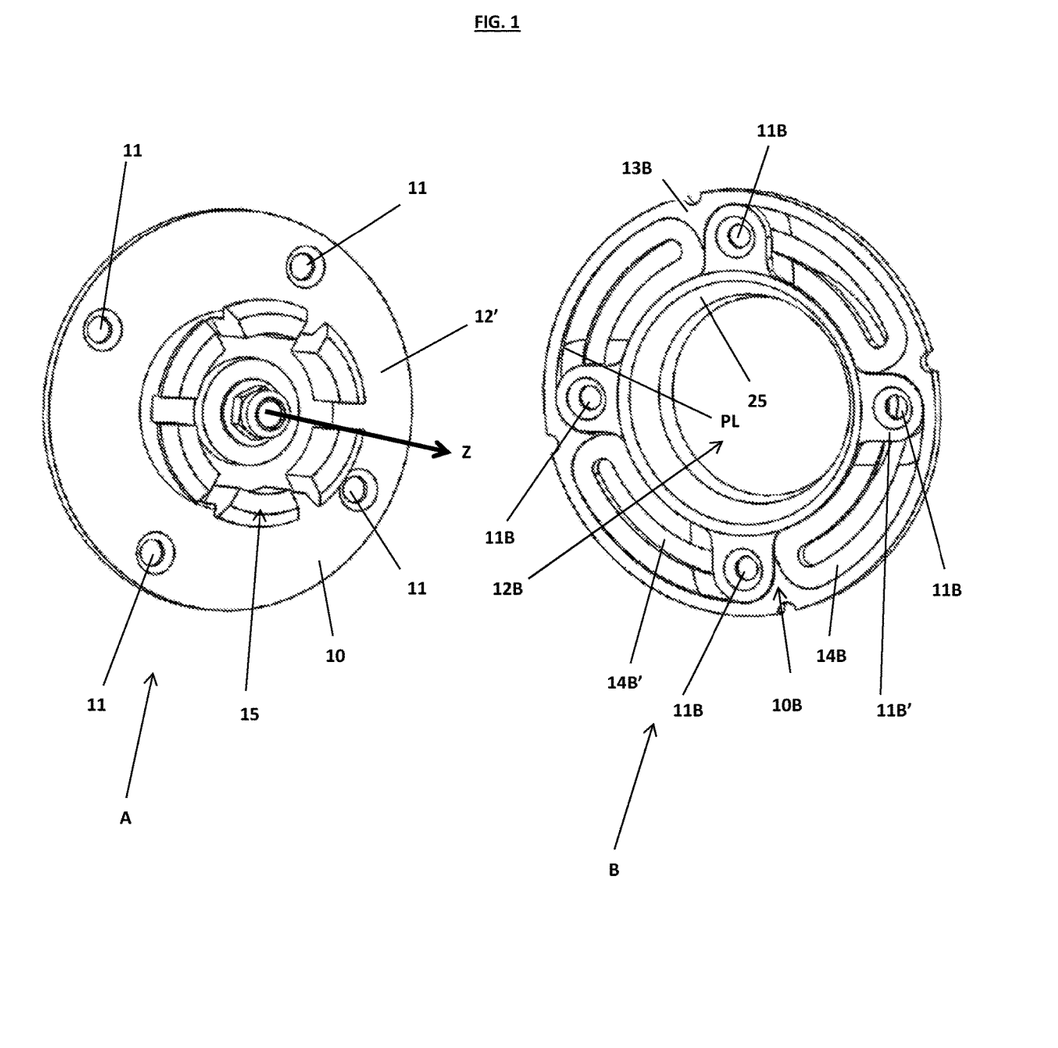
FIGS. 1, 3, 6, and 8B depict axonometric views of a device constructed according to the invention and formed by a first male element (A), which can be coupled in a snap-like, releasable manner to a second female element (B)
Figure 3:
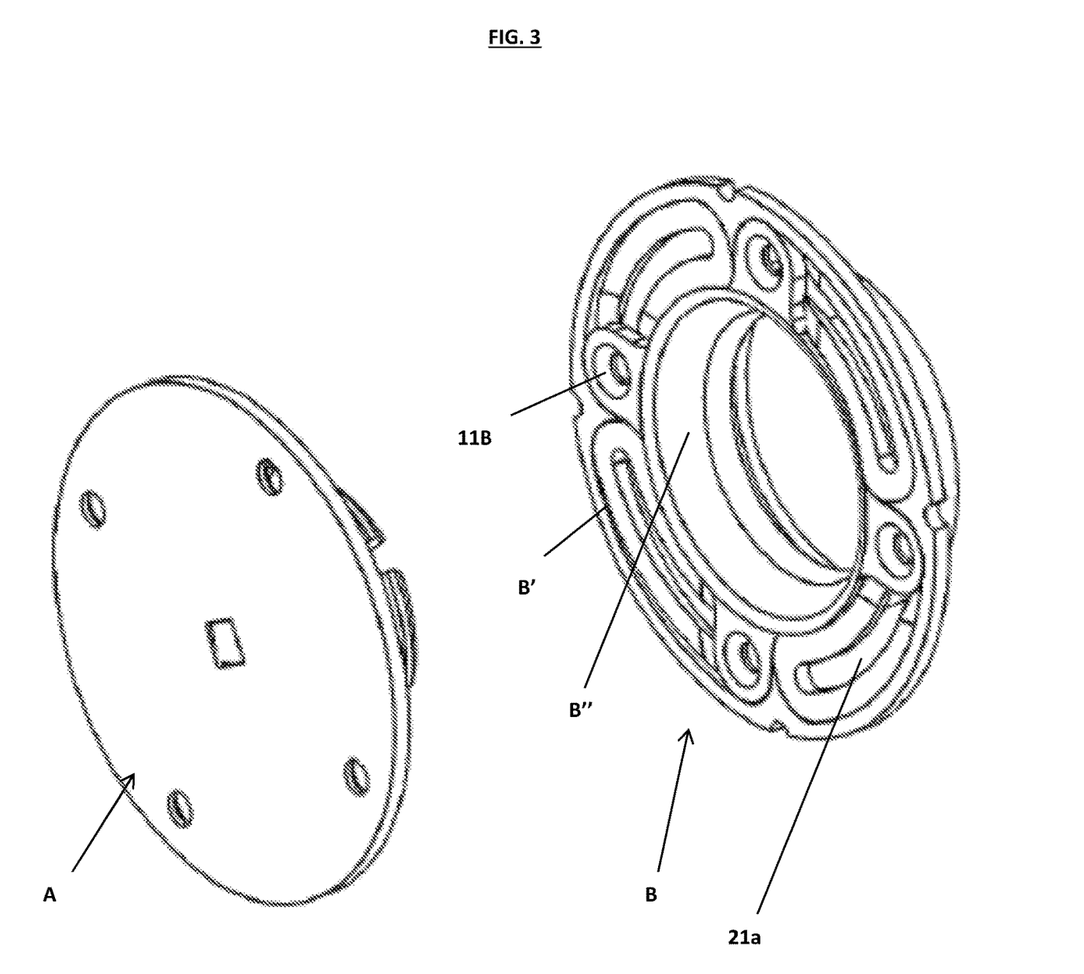
Figure 6:
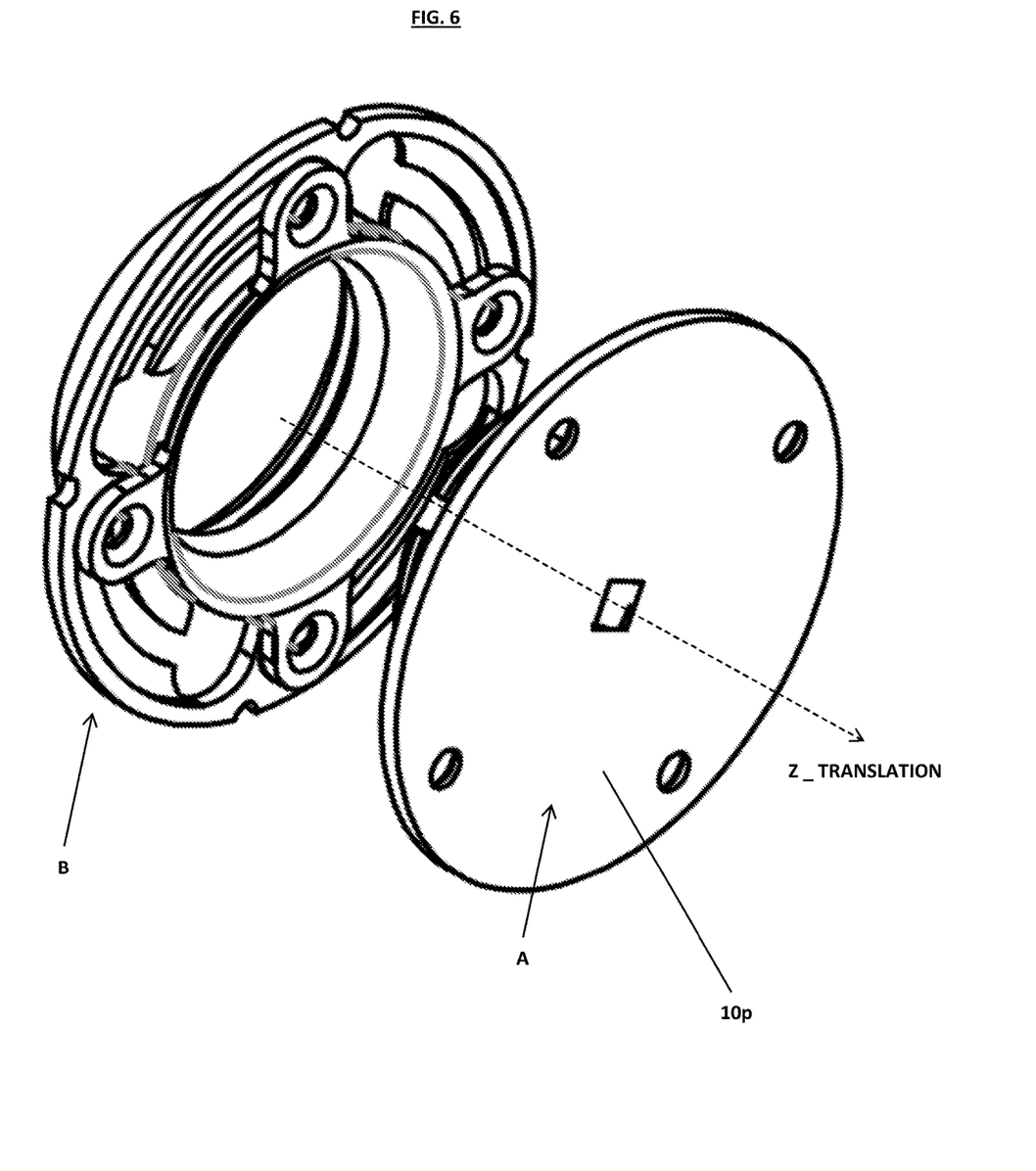
Figure 8A:
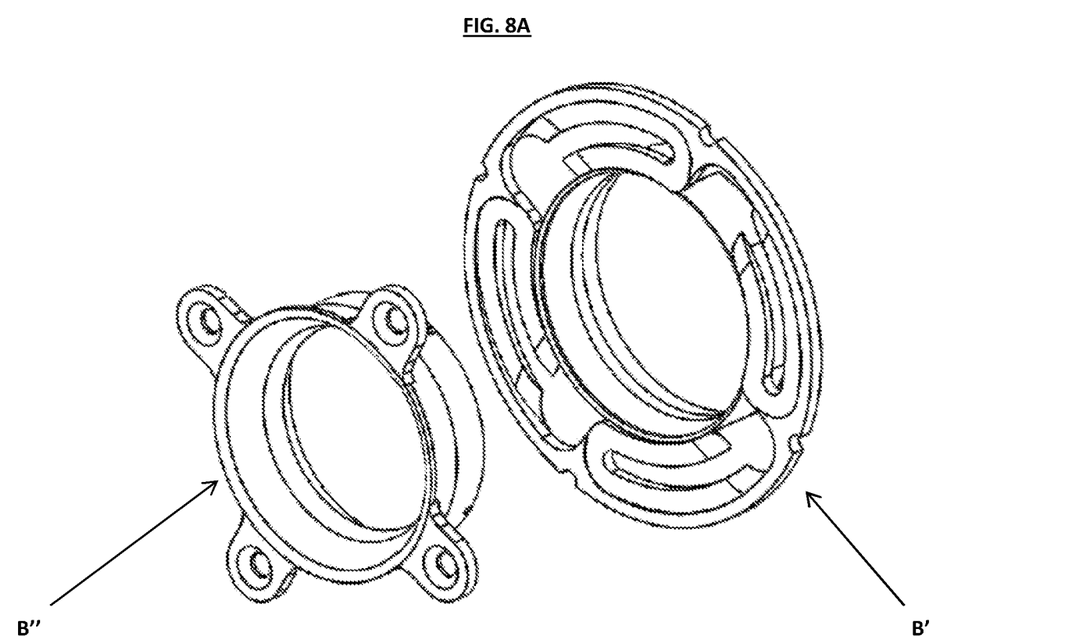
FIG. 8A depicts in an axonometric view the component B' and the component B" also depicted in section in FIGS. 4A and 4B.
Figure 8B:
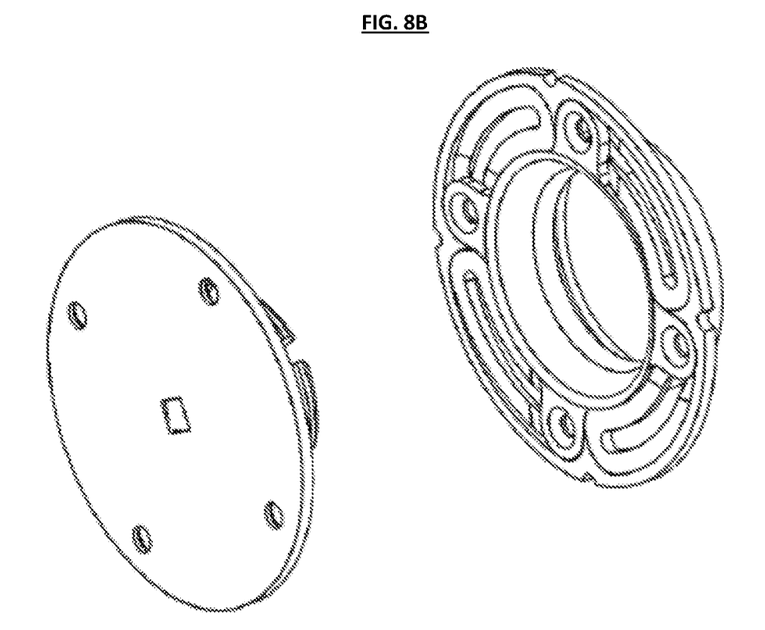

FIG. 1 depicts, in an axonometric view, a device in accordance with the present invention, also depicted in FIG. 3, in FIG. 6 and in FIG. 8B as well.

A male element A is provided, which is adapted to be inserted in a snap-like manner and then to be locked in a releasable manner into a female element B.

Therefore, the male element A (or fixing male A) is formed by an anchoring base 10, preferably a flat disc 10, which is provided with holes (four holes 11 are depicted in the example of FIG. 1), which enable the insertion of screws or other similar inserts for fixing the male element A for example to a panel 100 (not depicted in FIG. 1 for simplicity purposes) or to another body.

Figure 7:
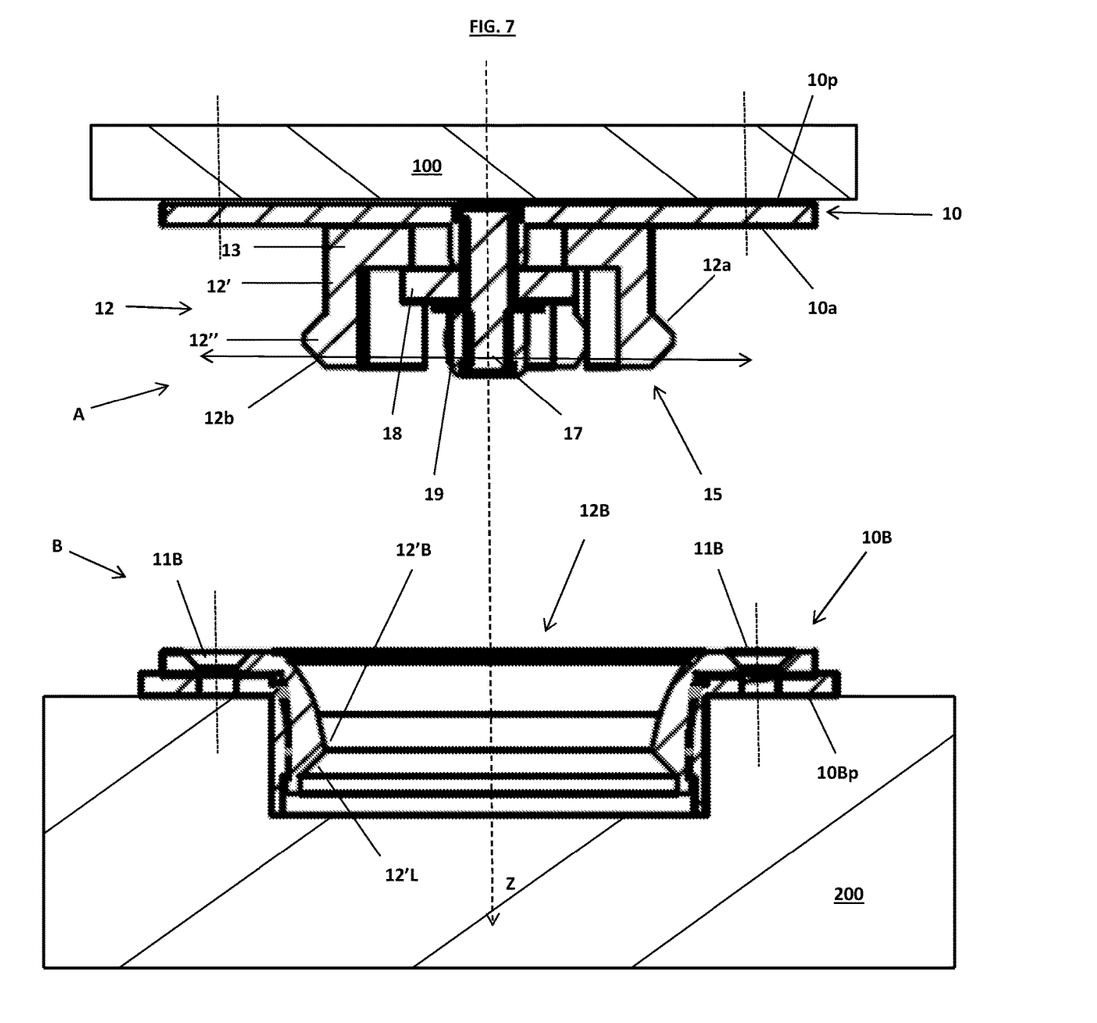
FIG. 7 is a section, which depicts the device formed by the male element A fixed to a respective body, for example, a panel 100, and the female element B fixed to the body 200, for example, a wall 200, so that, using the device, a mutual connection can be achieved, thus enabling an adjustment along the axis Z, which enables to vary at will and depending on need the final distance between the discoidal base 10 of the component A and the fixed discoidal base of the component B.

More particularly, as depicted in the section of FIG. 7, the anchoring base 10 is provided with a rear surface (10p) which leans in use onto the body where the male element A is connected. The front surface (10a), opposite to the rear one, is the one from which an engaging element 15 protrudes orthogonally and locks itself in a snap-like manner, as described thereinafter, into a female element substantially in the same manner as described in prior art document EP1950430.

In this way, each panel to be fixed onto a wall, such as covering panels of a wall of a nautical vessel, may be fitted with its respective fixing male A, which is coupled to the female element B fixed to the wall, for example.

This male element A, already present in the prior art and described before, is provided with a locking protuberance 15 also depicted in section in FIG. 7 and formed by a series of teeth 12 arranged according to a circular shape and protruding orthogonally from the discoidal base 10 (see FIG. 1).

The tooth 12, as better depicted in FIG. 7, is then formed by a vertical stem 12', which protrudes orthogonally from the base 10 and is shaped at the top so as to lock itself in a snap-like manner against the receiving housing of the female element B where it is inserted, as described in the prior art. In particular, still as depicted in FIG. 7, the top is provided with a protuberance 12", which enlarges from the vertical stem 12' towards the outside of the stem.

Still with reference to FIG. 7, also as in the prior art, the protuberance is preferably formed by a first section (12a) which branches off from the stem 12' outwards to enter back in a second section (12b), both sections being inclined at a predetermined angle so that both of them form a chamfering in the step of coupling/release. Therefore, the two sections (12a) and (12b) form an inverted V.

In particular, as explained thereinafter but also according to the prior art, the second section (12b) forms a chamfering, which facilitates the step of coupling when the tooth 12 is penetrating and therefore bends towards the axis of symmetry Z while the first section (12a) favors the release of the tooth, still causing an inflection towards the axis of symmetry Z.

For this purpose, the female element B is composed by an anchoring base, preferably a discoidal base 10B as well, and by four holes, (11B) obtained through the said discoidal base 10B and through it can be fastened to a surface, for example to the wall 200, through suitable screws.

As depicted in FIG. 7, the discoidal base 10B is provided with a rear surface (10Bp), which in use is abutting against the body to which the female element B must be fixed, exactly as it occurs and is described for the male element A.

The discoidal base 10B is holed axially and shapes a cylindrical receiving channel 12B (see for example FIG. 1) delimited by a cylindrical wall 25 shaped for receiving the circular ring 15 formed by the teeth 12 of the male component A, so that the teeth lock themselves in a snap-like manner within the cylindrical receiving channel 12B as in the prior art (see also, for example, the section of FIG. 7).

In fact, as depicted in FIG. 7, the shape of the channel 12B is such that the teeth 12, during the penetration, warp inwards, i.e. become bent towards the axis Z (vertical central axis of symmetry), reducing the overall diameter of the circular ring that they form to exceed afterwards a step formed in the receiving channel 12B and return elastically to the rest position.

More particularly, FIG. 7 depicts that the first part of the channel 12B, delimited by the wall 25, is bulging towards the axis of symmetry Z, thus causing a progressive reduction of the diameter. Therefore, when the ring gear 15 becomes inserted into the channel of the female component B, the chamfering 12b of each tooth 12 forming the ring gear 15 favors the penetration by crawling onto the bulging of the channel 12B, thus causing an inflection of each tooth 12 of the ring gear, which becomes inflected towards the central axis Z of symmetry. This bulging ends with a cusp 12'B from which a new broadening 12'L branches off.

Therefore, the cusp forms a sharp angle which, once exceeded by the chamfering 12b, enables the tooth 12 to lock itself in a snap-like manner into the housing since the chamfering 12a contrasts this broadening (12'L) after the elastic return of each tooth to the rest position (uninflected position).

For unlocking, it is sufficient to apply a traction opposite to that for coupling, which moves away the body 100 from the body 200, thus making the inclined side 12a act as a chamfering during the step of releasing and readily slide along the side 12'L, thus causing again an inflection of the entire tooth towards the axis Z. When the cusp 12'B has been exceeded, the tooth returns elastically to the rest position.

Anyway, this concept of a snap-like locking/unlocking is prior art as per publication EP1950430 to which reference is made.

Therefore, only for clarity purposes, FIG. 7 depicts how the male element A is connected through screws or otherwise inserted into the body 100, which may be a panel or a wall and, in the same way, the female body B becomes connected to the body 200, such as a panel or a wall. In that case, the housing which houses the cylindrical part 12B of the female B is obtained in the body 200.

Then, the female element B is built into the body 200 with the surface (10Bp) thereof abutting against the body and by the fixing which occurs through screws and/or inserts in general, as mentioned.

Therefore, if the body 100 is a covering panel for a boat wall and 200 is the wall, the attachment of the panel 100 to the wall 200 is quickly made through said system.

Still with reference to FIG. 7, as in the prior art, the male component A has a tolerance of tangential adjustment, as highlighted by the double direction of the arrow. This is possible since, structurally, the ring 15 gear 12 is formed by a circular base 13 (substantially a disc 13) from which the stems 12' protrude distanced and separated from one another and form the teeth 12 (see also FIG. 1). Therefore, as a whole, the circular or discoidal base 13 is a whole with the teeth, forming a cup-shaped body centrally holed so that the centering pin 17, pin orthogonal to the discoidal base 10, passes through this hole. The discoidal body 13 is therefore a circular ring gear with a central hole of a predetermined diameter, which, as depicted in FIG. 7, enables the passage of the centering pin 17 with a certain backlash. Therefore, the cup 12, is fixed in position at the discoidal base 10 through a fixing disc 18 locked through nut and screw 19, as also depicted in FIG. 1, so that said cup does not move along the axis Z. However, due to the tangential backlash, the entire cup can slide laterally along the plane formed by the discoidal plane 10, until the perimeter of the central hole relative to the base 13 touches the pin 17.

As mentioned, this serves for compensating errors in tangential positioning such that, in the coupling phase, the cup 12 is free to move tangentially for centering the channel 12B with tolerances which may be in the order of one millimeter.

According to the invention, as described thereinafter, the described device is now configured for enabling an adjustment along the axis Z as well, i.e., the longitudinal axis of the two elements A and B so as to make possible an adjustment of the distance between the two bodies 100 and 200, which are to be connected to each other.

Therefore, this enables making the created surface of the panels really flat, thus avoiding steps which create a discontinuity.

For this purpose, the female part B is made of two parts, disjointed and coupled to each other, so as to be reciprocally movable between one another.

Figure 4A:
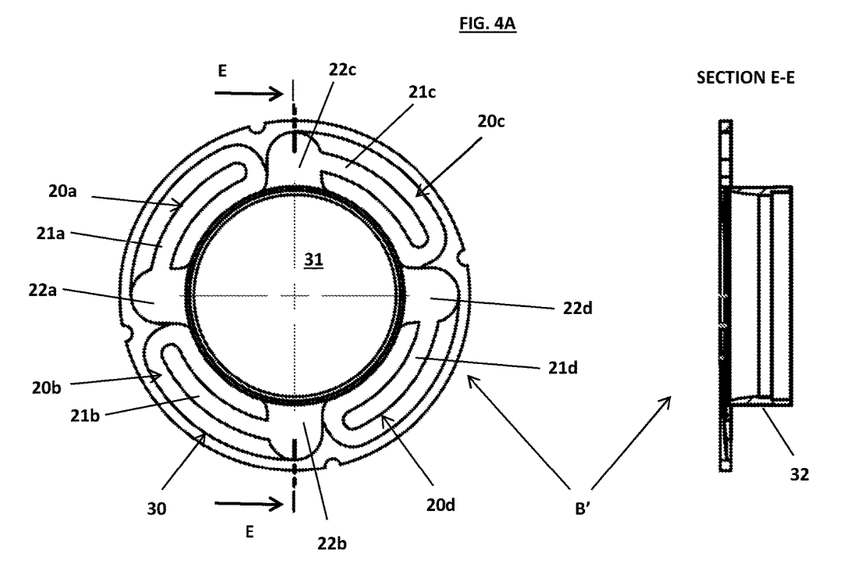
Figure 4B:
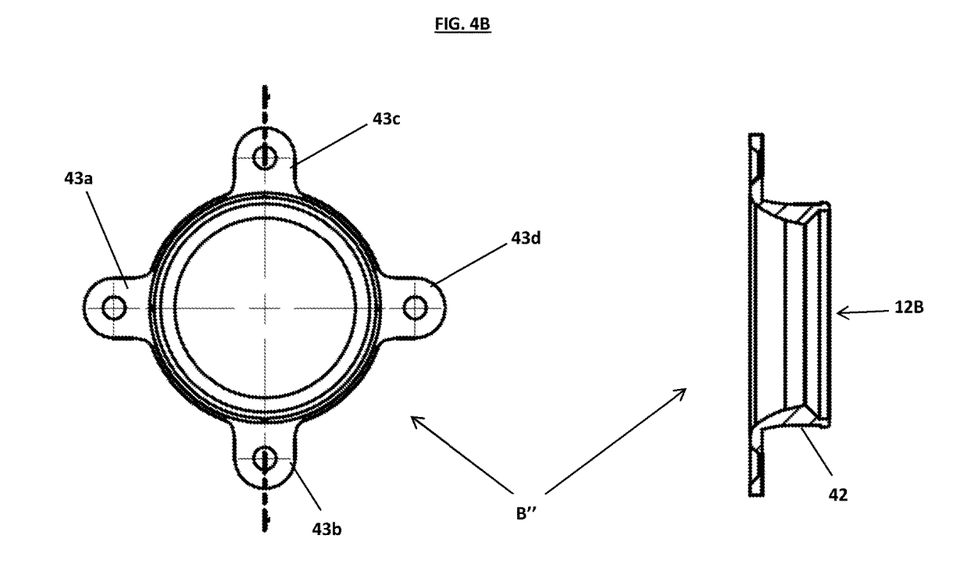

FIG. 4A and FIG. 4B depict these two parts.

The first part B' is formed by a discoidal body 30 holed centrally, thus forming a sort of circular ring. A circular wall 32 protrudes orthogonally from the discoidal body 30, in correspondence of the central hole 31, thus forming a cylindrical channel 31.

Curved paths 20 are obtained on the surface of the discoidal body comprised between the external perimeter thereof and the cylinder 32.

Curved paths 20 are arcs of circumference, and there are provided preferably four arcs of circumference in succession, which draw as a whole discontinuous sections of a circumference comprised between the external perimeter of the disc and the cylinder 32.

These four segments are indicated in FIG. 4A with reference numbers 20a, 20b, 20c, 20d.

As depicted by the section of FIG. 4B, the second part B" is in the form of a cylindrical body 42 as well which forms the receiving channel 12B of FIG. 7, i.e., the one delimited by the wall 25 of FIG. 1, and from whose base four appendixes (43a, 43b, 43c, 43d) extend radially. Each appendix is configured with such a size as to be insertable into the above-mentioned respective curved path (or guide) so as to move along it in a way that will be described thereinafter.

FIG. 8A, for the purpose of greater clarity, depicts an axonometric view of the two parts B' and B" which compose as a whole the female component B and are depicted disjointed from one another.

Figure 2:
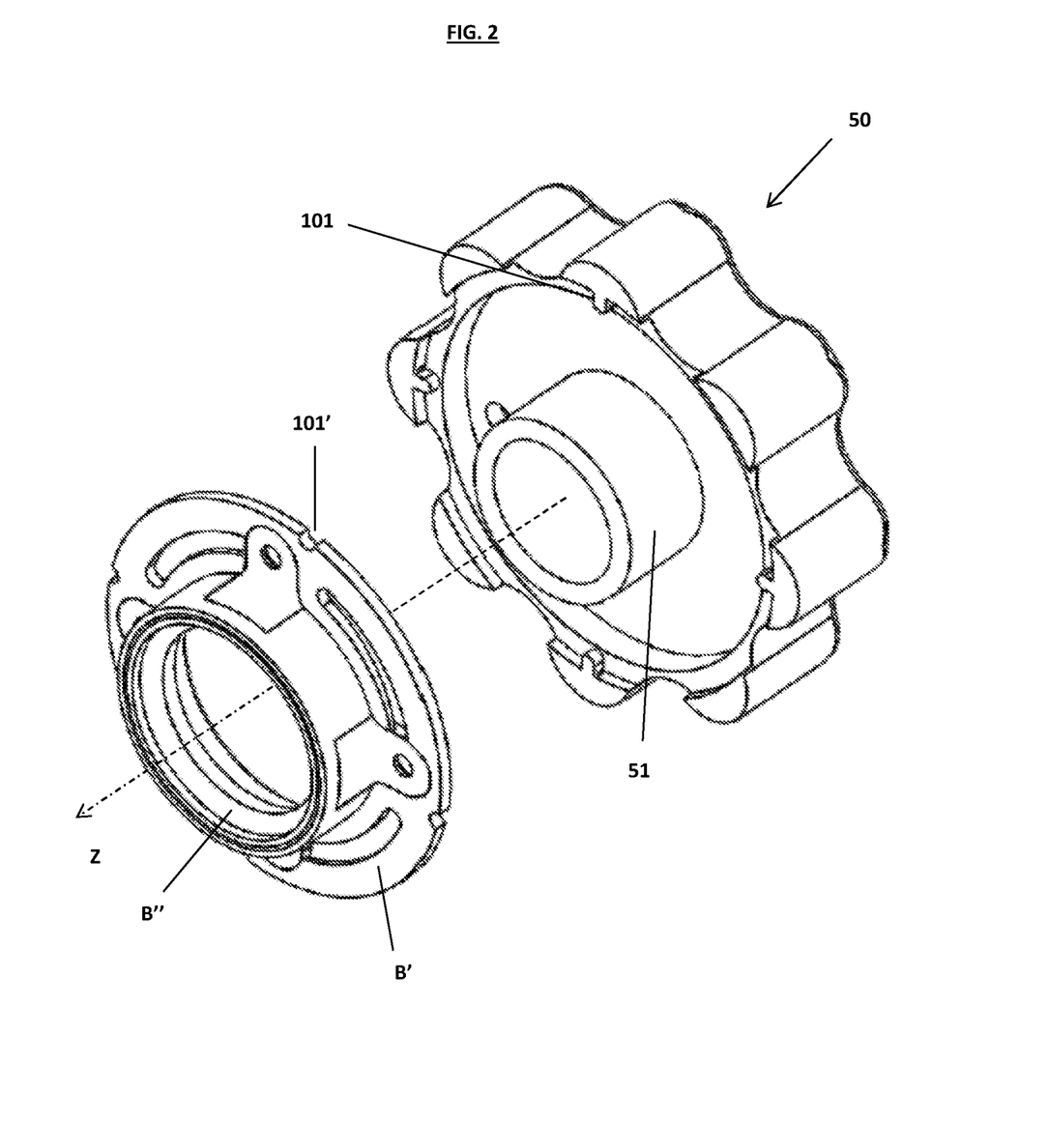
FIG. 2 depicts an accessory 50 usable for making an adjustment along the longitudinal axis Z according to the invention.

FIG. 1 and FIG. 2, as well as the above-mentioned FIG. 8A, depict such appendixes (43a, 43b, 43c, 43d).

Figure 5:
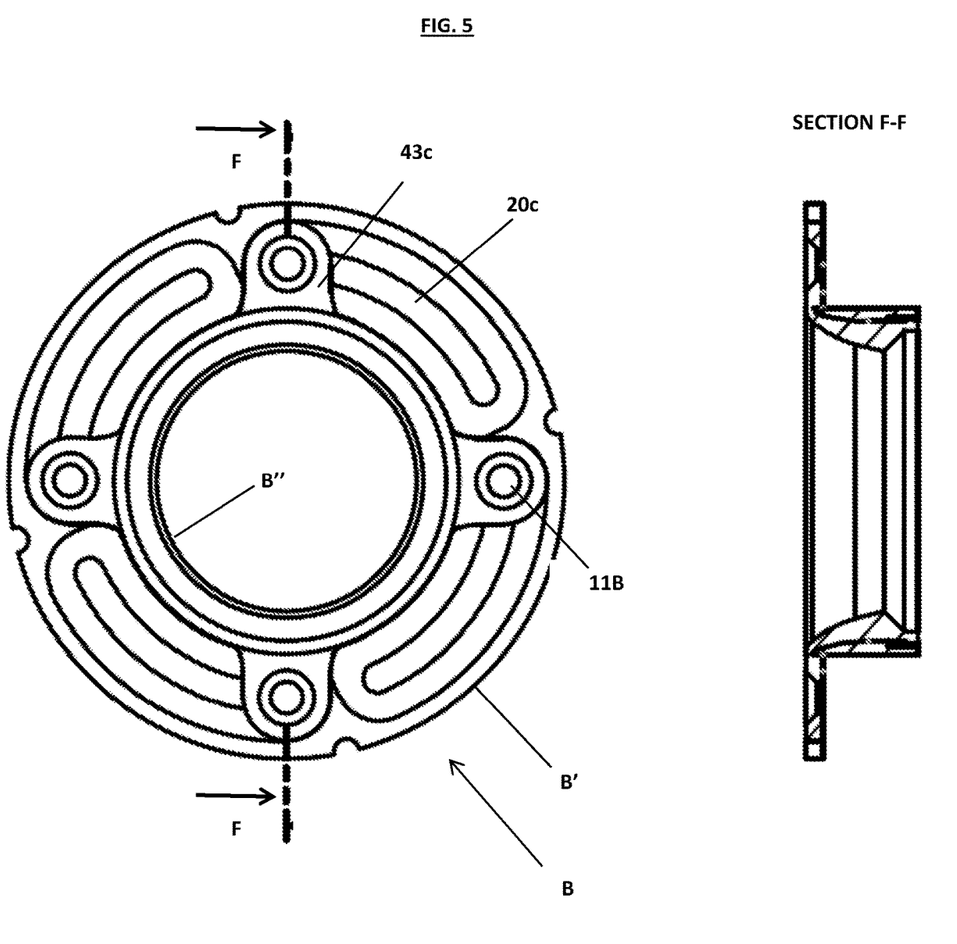
FIG. 5 is still a view and related section of the female element B, formed by the component B' connected to the component B"

FIG. 5 still depicts, in front and section views, the female element B formed by the second part B" combined with the first part B' such that such appendixes are positioned into the respective guide.

The coupling of part B" and part B' is not fixed since the two components B' and B" are movable with respect to one another.

In particular, the second component B" is rotatable with respect to the component B' and/or vice versa.

Therefore, they are not welded to one another but they are rotatable with respect to one another.

In addition to the reciprocal rotation, the coupling is such that it is possible to have a shifting along the axis Z of the first component B' with respect to the second B", or vice versa.

More particularly, through said rotatable coupling, as described thereinafter, it is possible to vary along the axis Z the position of the component B" with respect to B', thus adjusting de facto in this manner a reciprocal distance along the axis Z between the two panels or surfaces 100 and 200 which are connected to one another.

Substantially, the channel 25 shifts along the axis Z after the rotation.

In fact, as depicted in FIG. 4A, each one of such guides (20a, 20b, 20c, 20d) has an incision line (21a, 21b, 21c, 21d) passing through the entire thickness and forming a sort of center-line.

This incision line ends on a part with a broadening (22a, 22b, 22c, 22d), from which the respective appendix (43a, 43b, 43c, 43d) is visible and overlooks.

The incision has such a width as to enable the passage of the insert or fixing screw and this insert or fixing screw may slide along it.

Therefore, with reference to FIG. 3 for example, if screws are inserted into the hole 11B, as long as such screws do not penetrate the body 200 (therefore, considering the component B free), it is possible to rotate the component B' with respect to B" (or vice versa), since the inserts or screw which pass through the holes 11B slide along their own center-line notch (21a, 21b, 21c, 21d).

Each sliding guide (20a, 20b, 20c, 20d) is obtained by extracting and removing material from the surface from which it is obtained.

Figure 10:
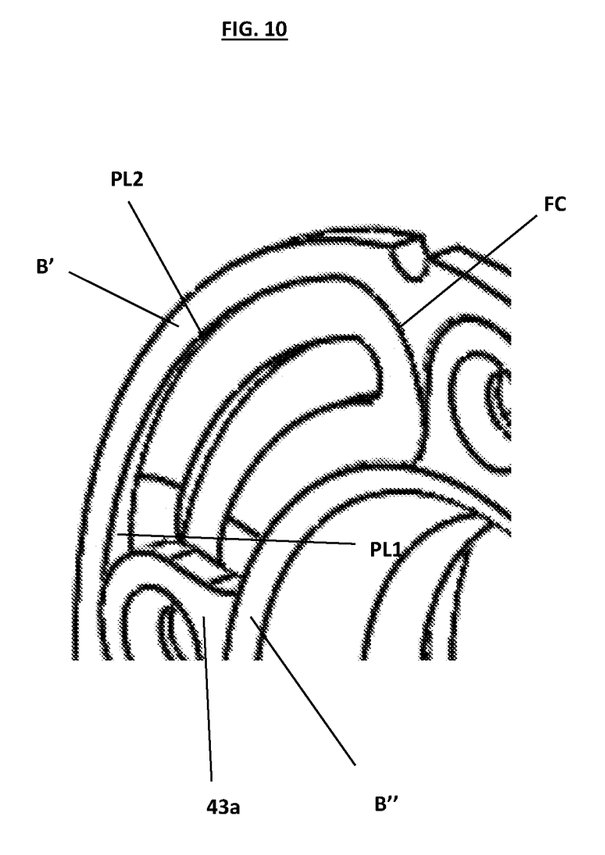
FIG. 10 depicts an enlarged detail that highlights the inclination of the track, which determines the movement along the axis Z of the component B" with respect to B', to which the component B" is coupled in a sliding manner.

More particularly, as depicted in greater detail in FIG. 10 but visible in FIG. 1 as well, the guide is produced by removing material so as to create a path with a specific inclination.

In fact, the figure depicts a removal of material which creates a track with an inclination.

The lateral wall (PL) starts from a starting point that has a height (PL1) greater than that at the end of the track where the height (PL2) tends to become zero.

The appendix (43a, 43b, 43c, 43d), which slides into its respective guide, after the rotation of the component B" with respect to B', moves from the starting position of FIG. 10 to the end-stroke position (FC) (still depicted in FIG. 10), thus becoming forced to go up along the inclined track and causing a shifting of B" with respect to B' along the axis Z.

Depending on the direction of rotation, B" shifts towards a direction or towards the opposite direction along the axis Z.

Figure 9A:
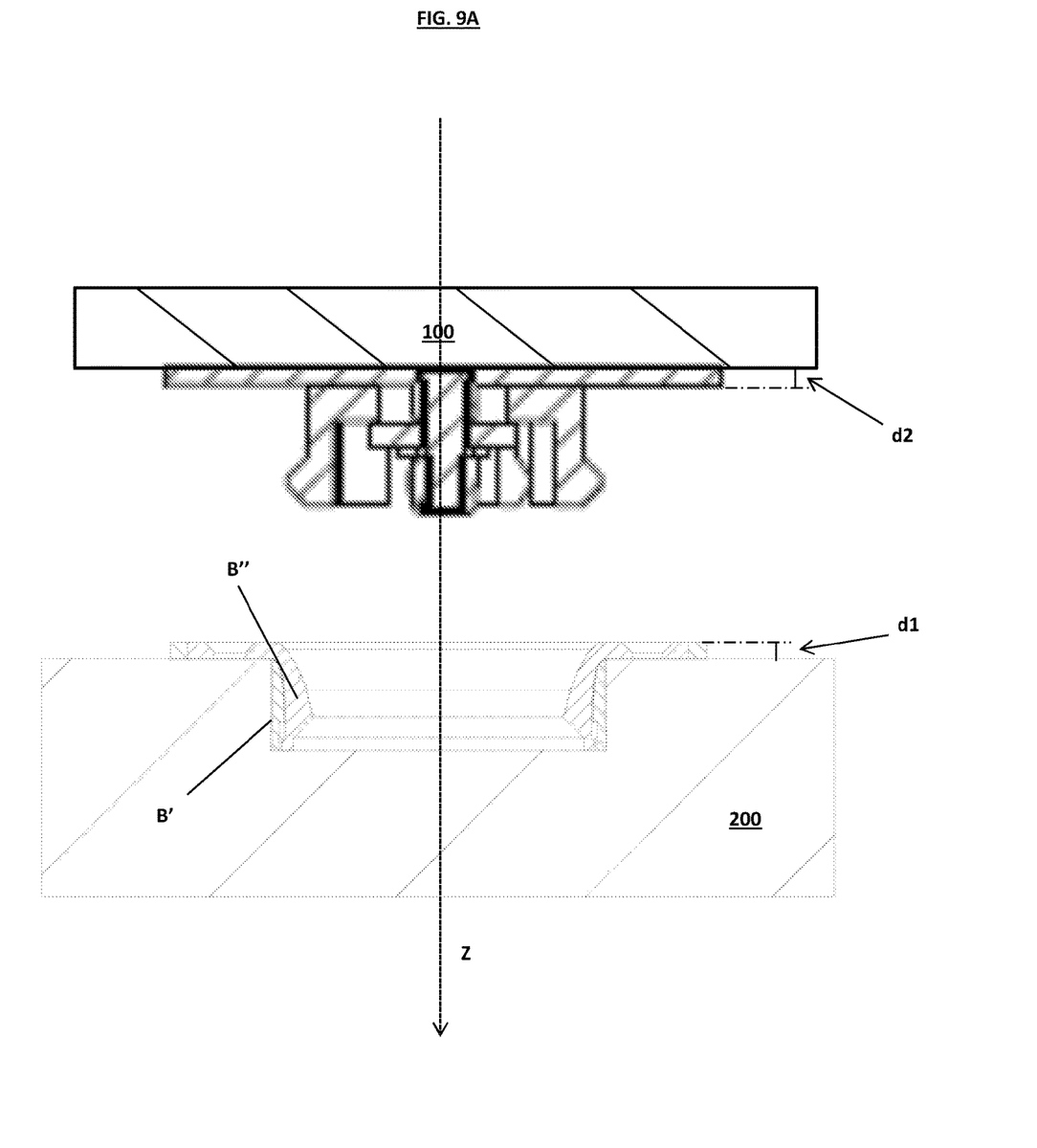
FIGS. 9A and 9B depict in succession, in section a movement along the axis Z to exemplify the above described operation.
Figure 9B:
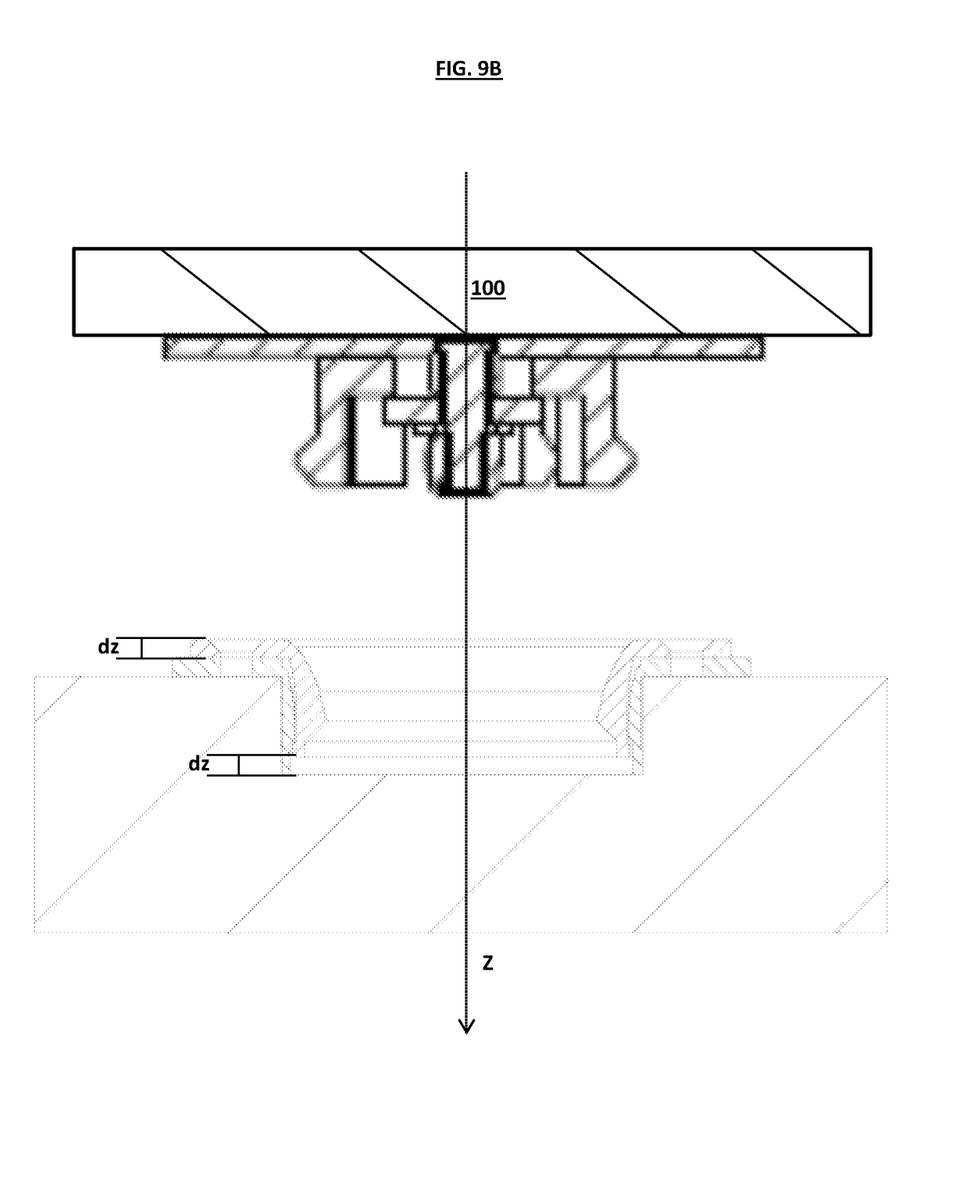

The succession of FIGS. 9A and 9B depicts in section the movement (dz) which can be obtained through this solution.

In particular, FIG. 9A depicts the condition highlighted in FIG. 10 with each appendix (43a, 43b, 43c, 43d) arranged at the end of the inclined path.

In this case, the component B" is at the end-stroke and when the male element A is inserted into the female element B, the result is that the panel 100 is distanced from the wall 200 by a quantity (d1+d2) indicated in FIG. 9A.

When B" is rotated clockwise with respect to B' (or equally B' rotates counterclockwise with respect to B"), each appendix (43a, 43b, 43c, 43d) moves to the end-stroke point (FC) of FIG. 10 or anyway towards any intermediate position, which entails a movement along an inclined path that goes up.

This causes a shifting along the axis Z of B" with respect to B' (i.e., a movement of the channel 25 along the axis Z) and FIG. 9B depicts the position where, with reference to FIG. 10, the appendix 43a (and the remaining appendices) reaches the end-stroke position (FC).

Substantially, the channel 25 moves by going up by a certain quantity (dz) such that, as it is inferrable from FIG. 9B, it determines after the coupling a distance between the two panels 100 and 200 which corresponds to the value (d1+dz+d2) of the preceding one (d1+d2).

Therefore, depending on the rotation, a value dz which enables a corrective margin is determined.

The adjustment of the distance between the bodies 100 and 200 entails equally the adjustment of the distance between the surfaces (10p) and (10Bp) of FIG. 7.

The process of adjustment may advantageously occur through the use of an accessory in the form of a knob 50 depicted in FIG. 2, which is fitted with engaging teeth 101 arranged so as to engage themselves with the notches 101' obtained onto the perimeter of the disc B'.

The knob has a cylinder 51 which is inserted into the channel 25 of the female component B to provide a guide for the coupling and during the coupling, the teeth 101 must fit into the notches 101'. In this way, by means of the knob, the disc B' may be rotated with respect to the component B" clockwise or counterclockwise, thus causing the shifting of B" with respect to B' (or vice versa) as described.

Therefore, in use, the adjustment along the axis Z may occur at any moment during installation without having to perform a whole disassembly of the fixing elements.

As previously described, the adjustment is obtained only by acting onto the component B while the component A is fixed through its own assembly screws and cannot be adjusted along the axis Z.

Unless the necessity of shifting along the axis Z is already known during the anchoring step of the component B, the assembly of the element B" within the discoidal body B' occurs in the fully rotated position so that the radial extensions (or, in other words, appendices 43a, 43b, 43c, 43d) are directly in contact onto the surface of the wall without interposition of the inclined sliding guide and then with the shifting along the axis Z to the minimum (position of FIG. 9A).

After a need has been determined to adjust the coplanarity of the panels or anyway the distance between the panel and the anchoring wall (axis Z), an adjustment may be performed, which occurs by acting onto the assembly screws, which are to be partially unscrewed for 2, maximum 3, mm in order to enable the axial rotation of the body B" (the axial rotation of 15° corresponds to a delta onto the axis Z of 0.5 mm and may occur for 60° maximum, with the maximum movement of 2 mm).

The adjustment has no fixed positions and, therefore, all the intermediate positions are possible.

The teeth of the knob and the above-described notches are arranged to help the user determinate the necessary rotation.

By means of the knob, the adjustment of the desired position occurs, which determines the achievement of a specific relative position of B' with respect to B" along the axis Z, and this position is consolidated by tightening again the screws or the inserts passing through the holes of the appendices 11B'.

At the end of the quick adjustment, the assembly screws will be screwed and in this way the movement of rotation will be locked and the desired distance between the panel and the wall will be obtained.

The invention claimed is:

1. A fixing device for a reciprocal fixing of two bodies to each other, comprising the reciprocal fixing of a panel to a wall or of two panels to each other, the fixing device comprising:
    a male element comprising an anchoring base and an engaging element, the anchoring base having a rear surface adapted for leaning and fixing onto one of the two bodies and a front surface from which the engaging element protrudes; and
    a female element comprising an anchoring base having a rear surface adapted for leaning and fixing onto the other one of the two bodies and a receiving channel adapted for receiving the engaging element of the male element, so that the engaging element, when inserted into the receiving channel, is locked in a snap and detachable manner inside the receiving channel so as to enable a releasable coupling of the two bodies, with the male element and the female element disposed between the two bodies,
    wherein the fixing device enables a selection of two or more different distances along an axis defined by the rear surface of the male element and the rear surface of the female element when coupled to each other and an adjustment of a mutual distance between the two bodies after coupling,
    wherein the female element is formed by a first element defining a central hole and a second element comprising the receiving channel, within which the engaging element is locked in the snap manner, the receiving channel becoming inserted within the central hole of the first element, the first and second element being rotatably coupled to each other so that a reciprocal rotation causes a shifting of the second element with respect to the first element along the axis and vice versa,
    wherein the first element defines a sliding track having a predetermined inclination, the second element having an appendix, which is positioned onto the sliding track when the second element is coupled with the first element so that, when the second element rotated by a predetermined amount with respect to the first element or vice versa, the appendix moves along the sliding track, the predetermined inclination of which causes, together with the rotation, also the shifting along the axis of the second element with respect to the first element and vice versa,
    wherein the first element defines four sliding tracks that are circumferentially offset so as to delimit a circular path, each sliding track being equal to the other sliding tracks and having the same inclination, the second element having four appendixes, which extend radially from a cylindrical body forming the receiving channel and each of which becomes positioned in a respective one of the four sliding tracks, and wherein the sliding track comprises a through notch passing through an entire thickness of the sliding track and extending along at least part of the sliding track.

2. The fixing device, according to claim 1, wherein the sliding track is shaped as a groove with the predetermined inclination.

3. The fixing device, according to claim 1, wherein each appendix has a through hole for passage of a screw or a fixing insert configured to enable the fixing of the female element to the body to which the female element is applied.

4. The fixing device, according to claim 3, wherein the through hole is aligned with the through notch, a width of the through notch being dimensioned to enable the passage of the screw or the fixing insert into the respective appendix so that the rotation of the first element with respect to the second element or vice versa can also occur when the screw is inserted into the through hole of the appendix.

5. The fixing device, according to claim 4, further comprising a knob having a predetermined number of teeth, which engage with respective notches in a perimeter of the first element, so that the knob enables the first element to rotate with respect to the second element.

6. The fixing device, according to claim 1, wherein the engaging element is formed by a plurality of flexible teeth, which form as a whole a cylindrical cup adapted to be inserted and locked in the snap manner inside the receiving channel.

7. The fixing device, according to claim 1, wherein the anchoring base of the male element has first holes configured to receive first screws or first engaging inserts so that the male element can be connected to one of the two bodies by insertion of the first screws or the first engaging inserts into the first holes, and wherein the anchoring base of the female element has second holes configured to receive second screws or second engaging inserts so that the female element can be connected to the other one of the two bodies due the insertion of the second screws or the second engaging inserts into the second holes.

8. A method of fixing a plurality of panels to a wall, the method comprising:
   arranging a fixing device according to claim 1, the step of arranging comprising:
   fixing a male element to the panel to be connected to the wall by connecting the anchoring base of the male element to the panel;
   fixing of the female elements to the wall by connecting the anchoring base of the female element to predetermined points of the wall; and
   connecting the panel to the wall by inserting the engaging element of the male element into the receiving channel of the female element so that the male element becomes locked in the snap manner into the receiving channel of the female element, thus realizing the connection and with the male element and the female element that are comprised between the panel and the wall;
   further comprising, when the mutual distance between the wall and the panel must be modified, a step of adjusting the mutual distance along the axis between the wall and the panel by releasing the panel from the wall, and subsequently adjusting the fixing device so as to adjust the mutual distance, which the rear surface of the male element and the rear surface of the female element assume therebetween when coupled and fixing the panel to the wall.

9. The method according to claim 8, further comprising the step of providing the engaging element with a plurality of flexible teeth, which form as a whole a cylindrical cup adapted to be inserted and locked in the snap manner inside the receiving channel.

* * * * *